United States Patent [19]

Nishiura

[11] Patent Number: 5,708,515
[45] Date of Patent: Jan. 13, 1998

[54] IMAGE INFORMATION PROCESSING APPARATUS INCLUDING AREA IMAGE SENSOR OPERABLE AS ELECTRONIC CAMERA AND IMAGE SCANNER

[75] Inventor: Fusao Nishiura, Iruma, Japan

[73] Assignee: Casio Computer Co., Ltd., Tokyo, Japan

[21] Appl. No.: 664,529

[22] Filed: Jun. 17, 1996

[30] Foreign Application Priority Data

Jun. 22, 1995 [JP] Japan .................. 7-177974

[51] Int. Cl.$^6$ .................................................. H04N 1/28
[52] U.S. Cl. ........................................ 358/473; 358/474
[58] Field of Search ........................... 358/471–474,
358/484; 348/345–347, 358; 355/55–56;
395/106

[56] References Cited

U.S. PATENT DOCUMENTS

| | | | |
|---|---|---|---|
| 4,734,781 | 3/1988 | Takahashi | 358/280 |
| 4,740,904 | 4/1988 | Nagle | 395/106 |
| 4,831,455 | 5/1989 | Ishikawa et al. | 358/229 |
| 4,939,580 | 7/1990 | Ishikawa et al. | 358/229 |
| 5,502,578 | 3/1996 | Smitt | 358/474 |

*Primary Examiner*—Edward L. Coles, Sr.
*Assistant Examiner*—Stephen Brinich
*Attorney, Agent, or Firm*—Frishauf, Holtz, Goodman, Langer & Chick

[57] ABSTRACT

An image processing apparatus includes an imaging lens, an area image sensor having solid-state imaging elements arranged in a planar manner, and an imaging device for converting an image of an imaging object read by the area image sensor into image information. The imaging device is switchable between an electronic camera function mode and image scanner function mode. When the device is switched into the electronic camera function mode, the image information for one frame is outputted, whereas when the imaging device is switched into the image scanner function mode, the image information derived when an object to be read is manually scanned by the area image sensor in response to a moving amount of the manual scanning operation is outputted as continuous image information. Image information may thus be acquired over a wide range by employing a single image information processing apparatus.

11 Claims, 9 Drawing Sheets

PRESENTLY ACQUIRED
8-LINE DOT DATA

PREVIOUSLY ACQUIRED
8-LINE DOT DATA

IMAGE INFORMATION PROCESSING APPARATUS INCLUDING AREA IMAGE SENSOR OPERABLE AS ELECTRONIC CAMERA AND IMAGE SCANNER

BACKGROUND OF THE INVENTION

1. Field of the Invention

The present invention generally relates to an image information processing apparatus equipped with imaging means such as an area image sensor, and provided with a portable terminal unit, a compact electronic appliance, and the like. More specifically, the present invention is directed to such an image information processing apparatus operable as an electronic camera and an image scanner.

2. Description of the Prior Art

Conventionally, portable type compact terminal apparatuses known as "notebook type personal computers" have multiple functions operable by employing light pens and tablets, and are therefore capable of processing various sorts of image information in addition to character code information. For instance, these portable type compact terminal apparatuses may insert an image internally entered by the light pens and the tablets, and/or another image externally supplied from a magnetic disk into an arbitrary position of a document. Furthermore, the portable type compact terminal apparatuses may edit an entered image by means of an editing process.

The functions of this sort of portable type compact terminal apparatus may be further increased by employing the following image information processing methods. That is, for instance, a printed matter such as a name card may be is manually scanned by an image scanner so-called as "a linear sensor, or a line sensor" so as to read image information of this printed matter, and this image information may be processed by the portable type compact terminal apparatus. Also, a human face and a new product may be imaged by an electronic still camera to acquire image information thereof which may be processed by this portable type compact terminal apparatus.

In this case, exclusively used connectors and interface units are provided with the portable type compact terminal apparatus. Either the image scanner or the electronic still camera is arbitrarily connected to this connector in order to transfer image information acquired by this image scanner or electronic still camera via the interface unit. However, to achieve such multiple functions, the image scanner and the electronic still camera are separately required in addition to this portable type compact terminal apparatus. As a consequence, since these separate electronic appliances must be continuously operated, there are cost problems and portability problems.

The present invention has been made to solve the above-described problems, and therefore, has as its object to provide an image information processing apparatus equipped with an imaging lens and an imaging means including an area image sensor constituted by arranging solid-state imaging elements in a plane manner. This imaging means may function as an electronic camera, or as an image scanner used to manually scan printed matter and the like.

SUMMARY OF THE INVENTION

To achieve the above-described object, an image processing apparatus, according to a feature of the present invention, is comprised of: imaging means for reading an image of an imaging object and for converting the read image of said imaging object into image information;

image reading means for deriving therefrom the image information converted by said imaging means as a continuous image information when an object to be read is manually scanned by said image reading means in response to a moving amount of said manual scanning operation thereof;

switching means for switching the function of said imaging means into any one of an electronic camera and an image scanner; and output means for outputting the image information for 1 frame from said imaging means when said switching means switches the function of said imaging means to an electronic camera, and also for outputting the continuous image information derived by said image reading means when said switching means switches the function of said imaging means to an image scanner.

According to the present invention, an image information processing apparatus is arranged by the imaging lens, and the imaging means including the area image sensor constituted by arranging solid-state imaging elements in a plane manner. The function of this imaging means is switchable to either an electronic camera or an image scanner. Thus, the image information may be acquired over a wide range by employing a single image information processing apparatus.

BRIEF DESCRIPTION OF THE DRAWINGS

A more complete understanding of the teachings of the present invention may be acquired by referring to the accompanying figures, in which.

DETAILED DESCRIPTION OF THE PREFERRED EMBODIMENTS

Referring now to FIG. 1 to FIGS. 8A and B an image information processing apparatus according to a preferred embodiment of the present invention will be described.

Figure 1:
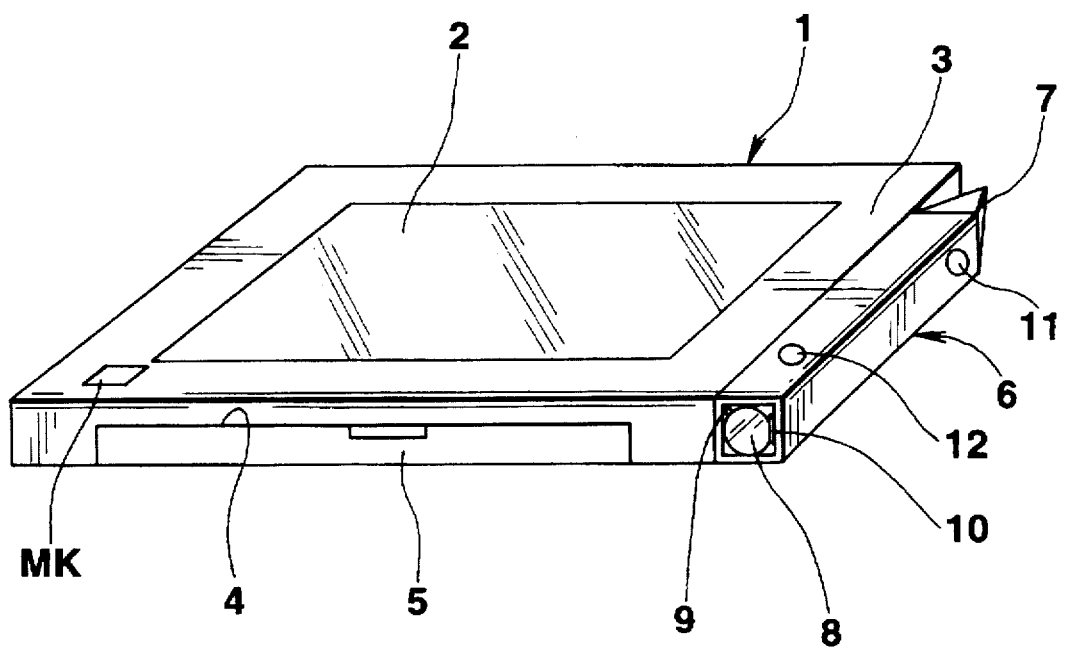
FIG. 1 shows a perspective view of a portable terminal apparatus of an image information processing apparatus, according to a preferred embodiment of the present invention.

FIG. 1 is a perspective view of a portable terminal apparatus of the image information processing apparatus.

As shown in FIG. 1, an entire shape of this portable terminal apparatus 1 is made in a thin plate. A liquid crystal display panel 2 equipped with a transparent touch panel is provided on an upper surface of this portable terminal apparatus. A keyboard 3 is employed around this liquid crystal display panel 2. The keyboard 3 is equipped with character entry keys, numeral entry keys, and various function keys. A disk insertion port 4 is provided on a front surface of the portable terminal apparatus 1, so that a magnetic disk unit 5 inserted through this disk insertion port 4 is loaded in the portable terminal apparatus 1. In this case, when a record key MK provided on the keyboard 3 is manipulated, image data and the like are recorded on the magnetic disk unit 5 to be saved.

Figure 2:
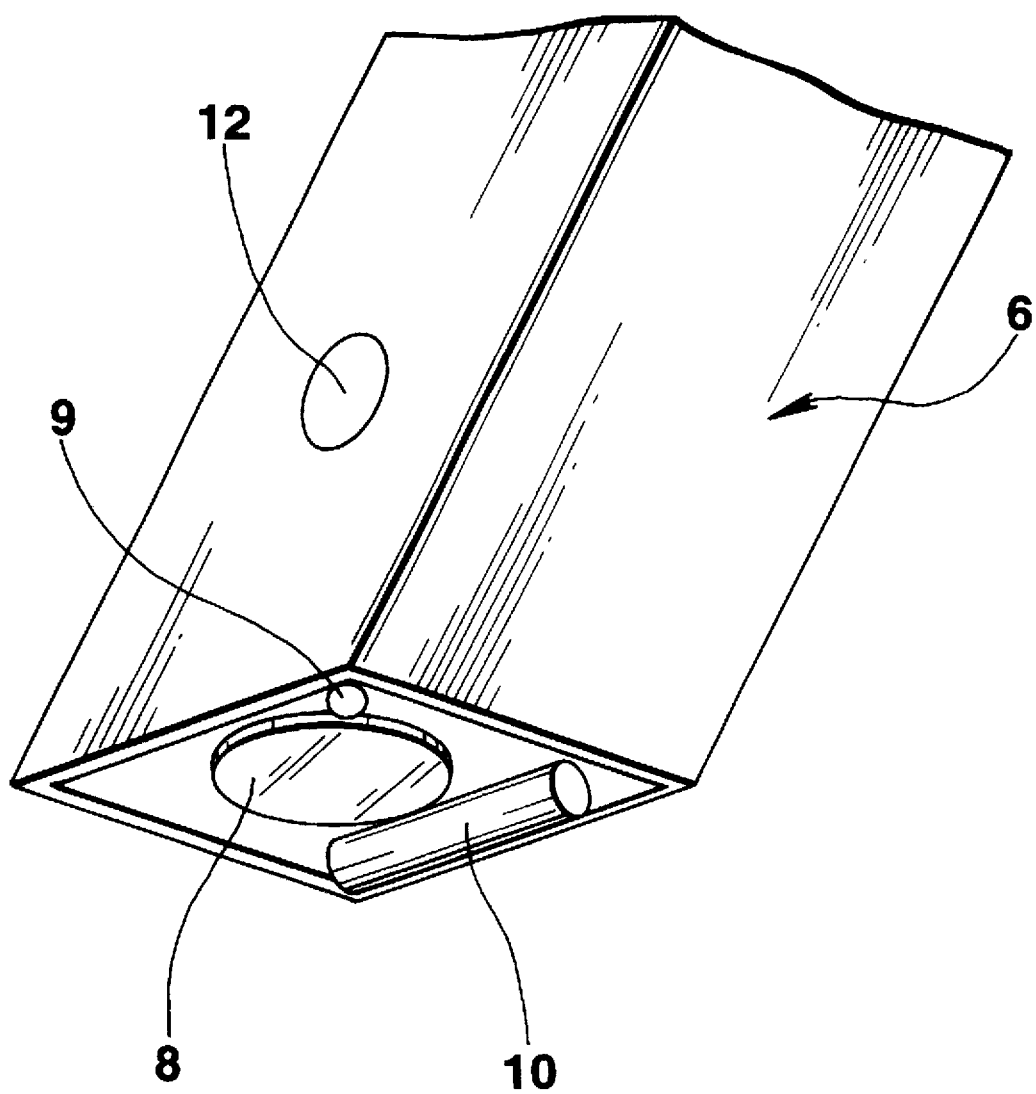
FIG. 2 is a partially enlarged view of a pen type data input apparatus of the image information processing apparatus, according to the preferred embodiment of the present invention.

On the other hand, FIG. 2 is a partially enlarged view of a pen type data input apparatus 6. As represented in FIG. 2, an entire shape of the pen type data input apparatus 6 is made in a rectangular prism. One end portion (tip portion) of this rectangular prism constitutes a pen tip portion 7, and the other portion thereof is opened which constitutes an opening portion. As apparent from the partially enlarged view of FIG. 2, an imaging lens 8, a lighting source 9, and a rotation roller 10 are stored in this opening portion. This pen type data input apparatus 6 may have two functions. That is, this pen type data input apparatus 6 is operable as a touch pen for direction an entry of a coordinate position by touching the transparent touch panel arranged in the stacked layer manner on the liquid crystal display panel 2 with the pen tip portion 7. Also, this pen type data input apparatus is operable as an electronic still camera and also an image scanner manually operated to scan a recording paper, which constitutes a feature of this embodiment of the present invention. A mode switch 11 is provided on one side portion of this pen type data input apparatus 6. This mode switch 11 is used to switch an electronic still camera mode and an image scanner mode. Then, the pen type data input apparatus 6 is mounted on one side portion of the portable terminal apparatus 1 in such a manner that this pen type data input apparatus 6 is rotatably mounted with respect to the portable terminal apparatus 1, while using a central portion of the pen type data input apparatus 6 along an axial direction thereof as a fulcrum, and further this pen type data input apparatus 6 is detachably mounted on the portable terminal apparatus 1. When the pen type data input apparatus 6 functions as the electronic still camera, this pen type data input apparatus 6 is rotated around the portable terminal apparatus 1, whereas when the pen type data input apparatus 6 may functions as either the image scanner or the touch pen, this pen type data input apparatus 6 is separated from the portable terminal apparatus 1.

Figure 3:
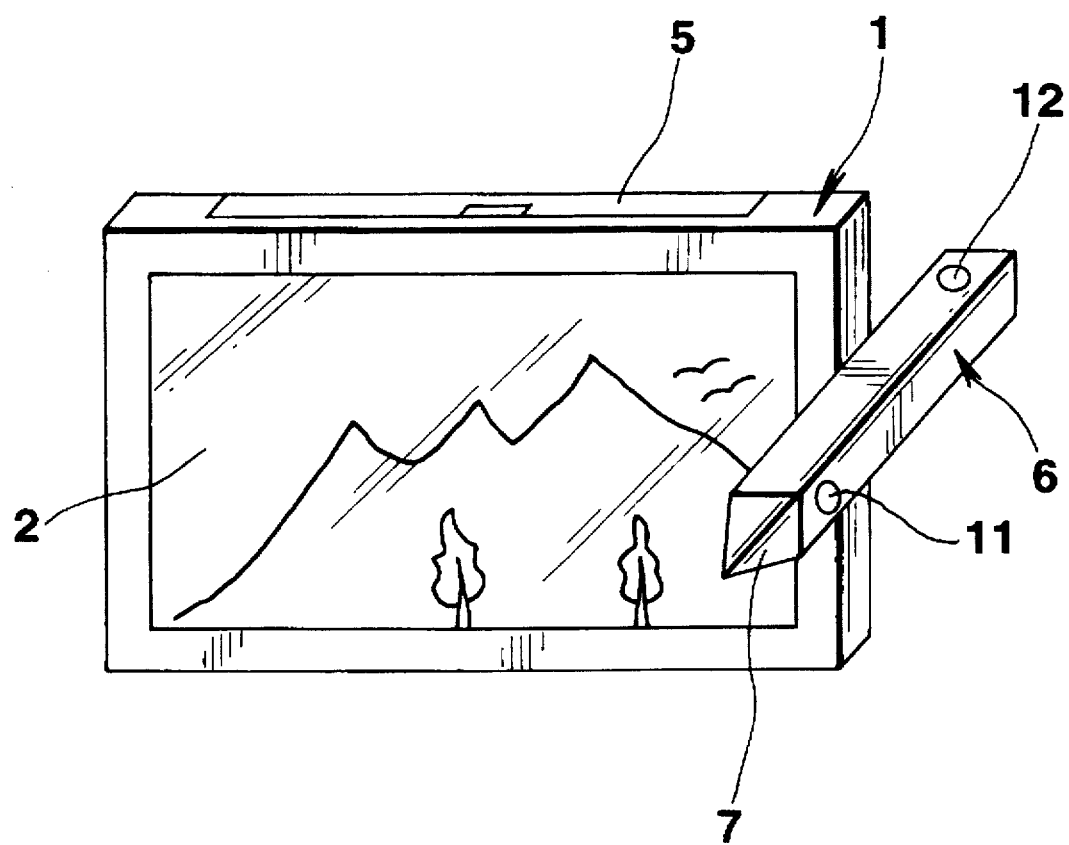
FIG. 3 schematically shows operation conditions when the pen type data input apparatus may function as an electronic camera.
Figure 4:
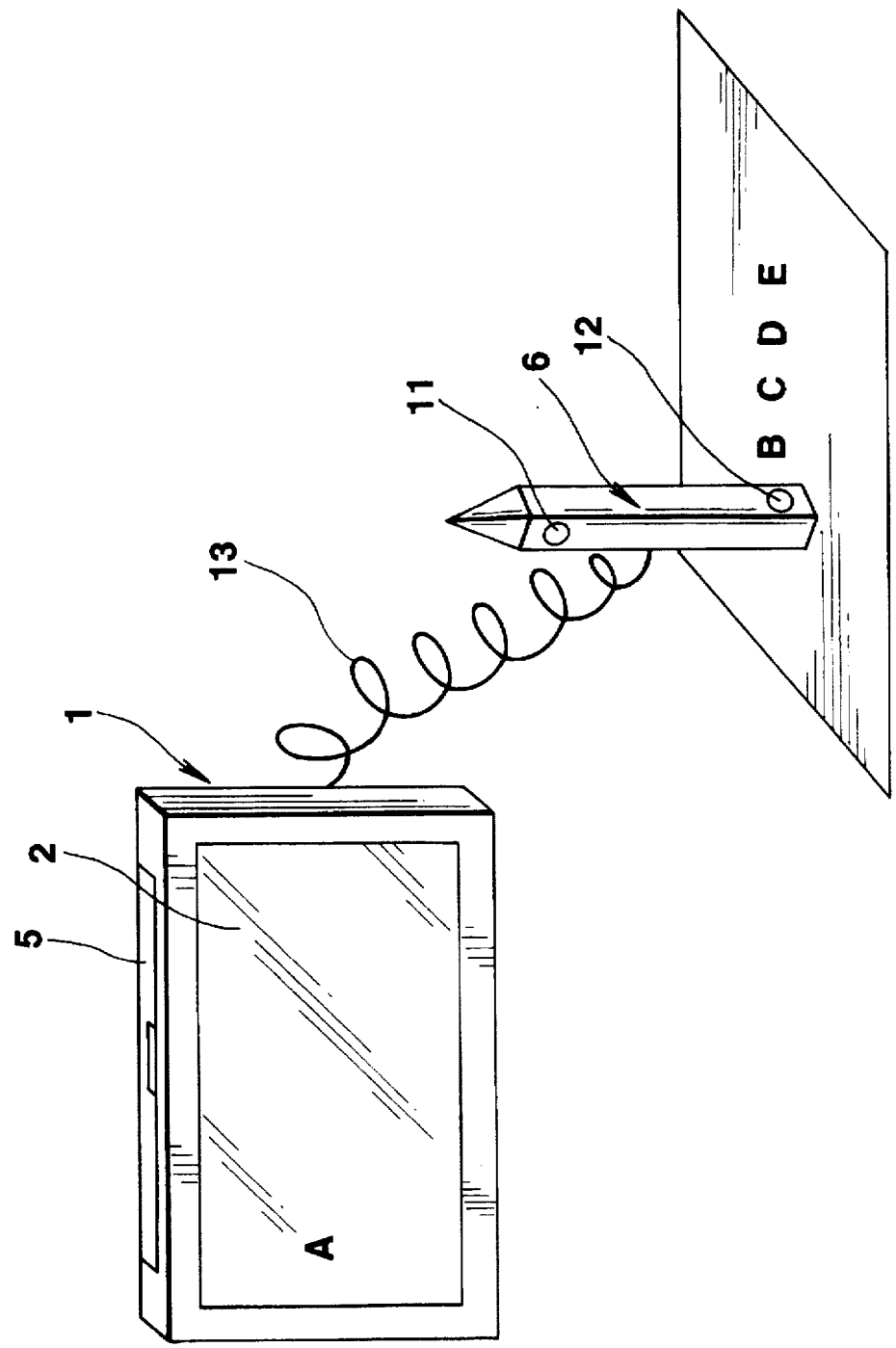
FIG. 4 schematically represents operation conditions when the pen type data input apparatus may function as an image scanner.

FIG. 3 illustrates such a case that the pen type data input apparatus 6 may function as the electronic still camera. In this case, the pen type data input apparatus 6 is rotated by 90 degrees with respect to the portable terminal apparatus 1 so as to direct the imaging lens 8 employed in the pen type data input apparatus 6 to an imaging object. Then, when a shutter switch 12 provided on one side portion of this pen type data input apparatus 6 is manipulated to image the imaging object, the data about this imaging object is transferred from the pen type data input apparatus 6 to the portable terminal apparatus 1, so that an image of this imaging object is displayed on the liquid crystal display panel 2. FIG. 4 illustrates another case that the pen type data input apparatus 6 may function as the image scanner. As shown in FIG. 4, this pen type data input apparatus 6 is separated from the portable terminal apparatus 1, and then the opening portion of this pen type data input apparatus 6 is depressed against a recording paper. In this image scanner, mode, the lighting light source 9 is turned ON to illuminate the surface of the recording paper. Under this condition, when the pen type data input apparatus 6 is moved over the paper surface to manually scan this paper surface along a direction perpendicular to a shaft of the rotation roller 10 after the shutter switch 12 has been operated, a moving amount of the pen type data input apparatus 6 is detected in accordance with a rotation amount of the rotation roller 10. The overlapped image portions are cut out from a plurality of frame images obtained in accordance with this moving amount, and the non-overlapped image portions thereof are cut off, and further the respective cut-off partial images are read as a continuous image. The data about this continuous image is transferred to the portable terminal apparatus 1, and then this continuous image is displayed on the liquid crystal display panel 2 in real time. It should be noted that reference numeral 13 indicates an electric cable used to supply an image signal an electric power between the portable terminal apparatus 1 and the pen type data input apparatus 6.

Figure 5:
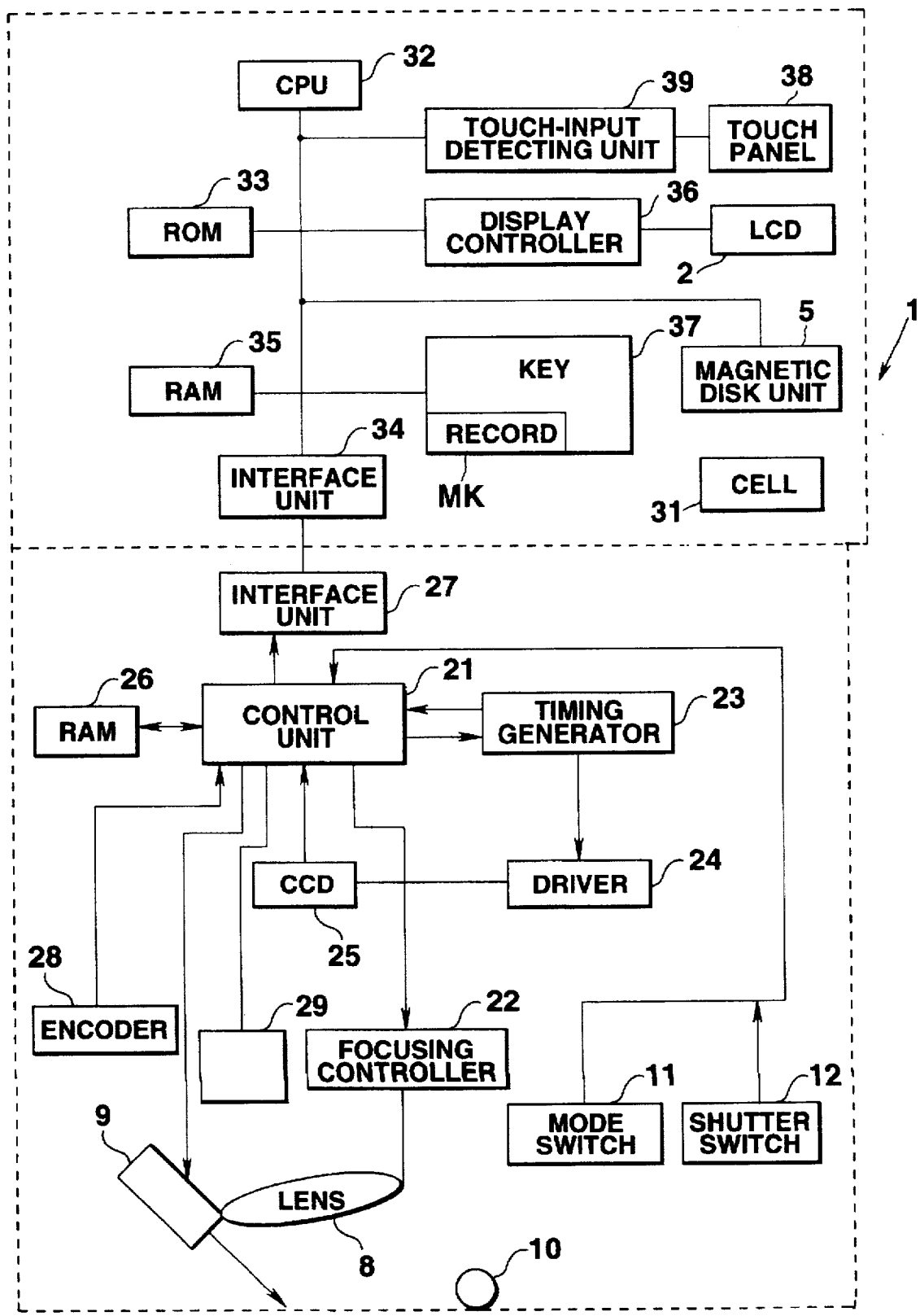
FIG. 5 is a schematic block diagram for indicating internal arrangements of the portable terminal apparatus and the pen type data input apparatus.

FIG. 5 is a schematic block diagram for indicating an internal circuit arrangement of the above-explained portable terminal apparatus 1 and the pen type data input apparatus 6. First, a description is made of the internal circuit arrangement of the pen type data input apparatus 6.

A control unit 21 is a central processing unit for controlling overall operations of this pen type data input apparatus 6, and switches the electronic still camera mode and the image scanner mode in response to the input signal of the mode switch 11. Now, it is assumed that the electronic still camera mode is switched, the control unit 21 drives a focus control unit 22 to control a focal point of the imaging lens 8. Then, when the shutter switch 12 is manipulated, the control unit 21 causes a timing generator 23 to generate an initiate timing signal which will then drive a driver 24.

A CCD (charge-coupled device) area image sensor 25 is constructed by arranging CCD elements in a plain form. The CCD area image sensor 25 owns the sufficient number of pixels capable of imaging a still picture in high image quality, and is driven under control of the driver 24. In response to a horizontal clock signal and a vertical clock signal produced from the timing generator 23, the control unit 21 scans the CCD area image sensor 25 to convert an image of an imaging object optically received by the CCD area image sensor 25 into RGB (three primary colors) color image information which is acquired therein. The RGB color image information data are stored into a RAM 26, and thereafter are transferred to an interface unit 27. This interface unit 27 converts this RGB color image information data into serial image information data which will then be transferred to the portable terminal apparatus 1.

An encoder 28 is an optical type encoder such that when the pen type data input apparatus 6 is manually scanned in the image scanner mode while depressing the rotation roller 10 rotated over the recording paper, the moving amount of this pen type data input apparatus 6 may be optically detected in accordance with the rotation amount of the rotation roller 10. In other words, this encoder 28 is arranged in such a manner that a large number of through holes, or black marks are formed on a disk in a coaxial manner, which is co-operated with the rotations of the rotation roller 10, and a pulse signal is produced every time either the through holes or the black marks are detected by way of a light emitting element and a light receiving element. It should be noted that this encoder 28 may be constructed of a brush contact type encoder, or an arbitrary type encoder. In response to the pulse signal produced from the encoder 28, the control unit 21 detects the rotation amount of the rotation roller 10 (moving amount of pen type data input apparatus 6). Also, every time this moving amount of the pen type data input apparatus 6 reaches a preselected amount, the control unit 21 drives the driver 24 via the timing generator 23, and also drives a shutter control unit 29 to start the imaging operation. The portional image information is cut of from a plurality of frame image information acquired in this manner, and then the cut-off partial image data is transferred as continuous image data to the interface unit 27. In other words, the control unit 21 writes the image information data about 1 screen into the RAM 26, and further extracts such image data corresponding to a cut-off region from the RAM 26, namely this "cut-off region" corresponds to a head region of one frame, which is prefixed. Thereafter, the control unit 21 repeats an operation to erase the memory content of the RAM 26 every one frame. Thus, the respective partial images acquired in this manner are sent as a continuous image to the interface unit 27. It should be understood in this embodiment that the cut-off region owns a dot region having a such dimension defined by 8 dots along the transverse direction (i.e., moving direction of pen type data input apparatus 6) and 8×n dots (8-dot line) along the longitudinal direction corresponding to the maximum dot "n" of 1 frame, and then, only the image portion corresponding to this cut-off region is extracted from the head portion of one frame is extracted, whereas other image portions of one frame are cut out.

On the other hand, the portable terminal apparatus 1 employs a power source constructed of a secondary battery (storage battery) 31. A CPU 32 controls overall operations of this portable terminal apparatus 1 in accordance with various sorts of programs previously stored in a ROM 33 and a RAM 35. The CPU 32 writes the image information data acquired via the interface unit 34 into the RAM 35, and also makes such a judgement as to whether this acquired image information data has been entered in the electronic still camera mode, or the image scanner mode. Accordingly, this CPU 32 executes the proper process operation in accordance with the judgement result. In this embodiment, the CPU 32 controls the display controller 36 to display the image information stored in the RAM 35 on the liquid crystal display panel 2 in the electronic still camera mode, whereas this CPU 32 controls the display controller 36 to display the continuous image transferred from the pen type data input apparatus 6 on the liquid crystal display panel 2 in real time.

An input unit 37 constitutes the keyboard 3. When the record key of this keyboard 3 is manipulated, the CPU 32 records the image information data stored in the RAM 35 on the magnetic disk unit 5 so as to be saved therein. When a touch panel 38 is touched byway of the pen tip portion 7 of the pen type data input apparatus 6, a touch input detecting unit 39 detects this touch-in entry, so that the CPU 32 executes the normal pen data input process operation.

Referring now to flow charts shown in FIG. 6 and FIG. 7, operations of this embodiment will be described.

Figure 6:
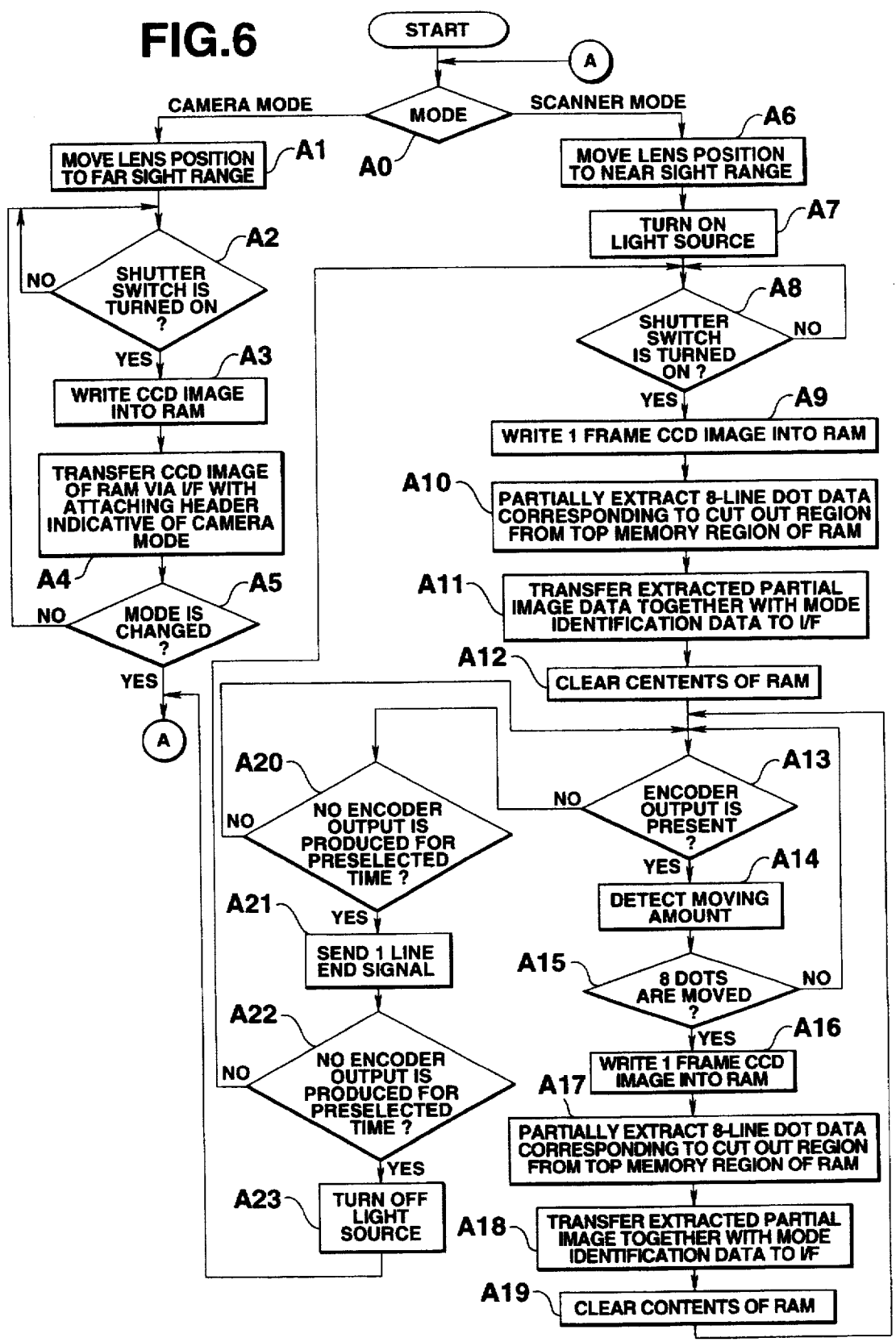
FIG. 6 is a flow chart for describing operations of the pen type data input apparatus.

FIG. 6 is a flow chart for describing operations of the control unit 21 employed in the pen type data input apparatus 6.

First, the control unit 21 judges the operation mode based upon the setting condition of the mode switch 11 (step A0). When the electronic still camera mode is set, the control unit 21 drives the focus control unit 22 to move the position of the imaging lens 8 to the far sight range (step A1). At this time, when the shutter switch 12 is operated (step A2), the image of the imaging object sensed by the CCD area image sensor 25 is converted into the image information data, and then this image information data is written into the RAM 26 (step A3). Then, mode identifier data indicative of the electronic camera mode is added to this image information data, and the resulting image information data for 1 frame is transferred as serial data from the interface unit 27 to the portable terminal apparatus 1 (step A4). Subsequently, the control unit 21 judges as to whether or not the mode change is carried out by operating the mode switch 11 at a step A5, and then if the electronic still camera mode is still selected, the process operation is returned to the step A2.

On the other hand, when the scanner mode is selected, the process operation is returned to the step A0. At this step A0, the control unit 21 judges that the scanner mode has been selected, and then drives the focus control unit 22 to move the position of the imaging lens 8 to the near sight range (step A6). Also, the control unit 21 turns ON the lighting light source 9 (step A7). Then, the control unit 21 is brought into a waiting state until the shutter switch 12 is manipulated (step A8). At this time, as represented in FIG. 4, the shutter switch 12 is first manipulated under such a condition that the pen type data input apparatus 6 is put on the recording paper while the imaging lens 8 thereof is directed to the paper surface thereof, the shutter switch 12 is manipulated. As a consequence, the control unit 21 writes the CCD image of 1 frame into the RAM 26 (step A9), and also partially extracts the dot data of 8 lines which corresponds to the cut out region from the top data region of the RAM 26 (step A10) (see FIG. 8A). Thereafter, the extracted partial image data is transferred in combination with the mode identification data via the interface unit 27 to the portable terminal apparatus 1 (step A11). Then, the memory contents of the RAM 26 are erased (step A12). As a result, only the partial image data corresponding to the cut out region is extracted from the CCD image data for 1 frame, whereas the other image data are cut off which may be equivalently masked in software manner.

Next, the control unit 21 checks as to whether or not the encoder 28 outputs the encoder pulse signal (step A13). When the pen type data input apparatus 6 is moved over the recording paper, since the pulse signal is outputted from the encoder 28 in accordance with the moving amount of this pen type data input apparatus 6, the control unit 21 counts this encoder pulse signal is detect this moving amount (step A14). The control unit 21 checks as to whether or not the pen type data input apparatus 6 has been transported for 8 dots (step A15). If NO, then the process operation is returned to the step A13 until the control unit 21 could detect the movement of the pen type data input apparatus 6 for 8 dots, at which this control unit 21 will detect the moving amount. When the movement of the pen type data input apparatus 6 for 8 dots is detected, a similar process operation to that defined from the above-described steps A9 to A12 is carried out (step A16 to A19). That is, at a step A16, after the CCD image data for 1 frame is written into the RAM 26, the 8-line dot data corresponding to the cut out region is extracted from the top memory region of the RAM 26 is extracted at a step A17 (see FIG. 8B). At a step A18, this 8-line dot data is transferred together with the mode identification data to the interface unit 27. At a step A19, the memory contents of the RAM 26 are erased. Then, the process operation is returned from the step A19 to the step A13 at which the above-described process operations as defined from the step A16 to the step A19 are repeated every time the 8-dot movement is detected.

Now, when it is detected at the step A13 such that no pulse signal is derived from the encoder 28, the process operation is advanced to a step A20 at which another check is done as to whether or not the pulse signal could not be derived from the encoder 28 during a preselected time period. If the encoder pulse signal could be derived during a predetermined time period, then the process operation is returned to the step A13. Conversely, if the encoder pulse signal could not be derived for a preselected time period, then the control unit 21 may recognize that the manual scanning operation of the pen type data input apparatus 6 for 1 line could be accomplished, and then sends out a 1-line end signal via the interface unit 27 (step A21). At this time, if no mode switching operation is carried out, then the process operation is returned to the step A8 in order to prepare for the manual scanning operation with respect to the next line. To the contrary, when the operation mode is switched from the present scanner mode into to electronic still camera mode, the control unit 21 turns OFF the lighting light source 9 (step A23).

As described above, in this scanner mode, the imaging operation is carried out in response to the first manipulation of the shutter switch 12. Subsequently, the imaging operation is performed every time the 8-dot movement of the pen type data input apparatus 6 is detected in response to the encoder pulse signal derived from the encoder 28. With a series of the above-described operations, the CCD image data for a plurality of frames can be acquired. Then, a portion of these CCD image data is cut out, and the respective cut-out partial image data are sequentially transferred as the continuous image data via the interface unit 27 to the portable terminal apparatus 1.

Subsequently, operations of the portable terminal apparatus 1 will now be explained with reference to FIG. 7.

Figure 7:
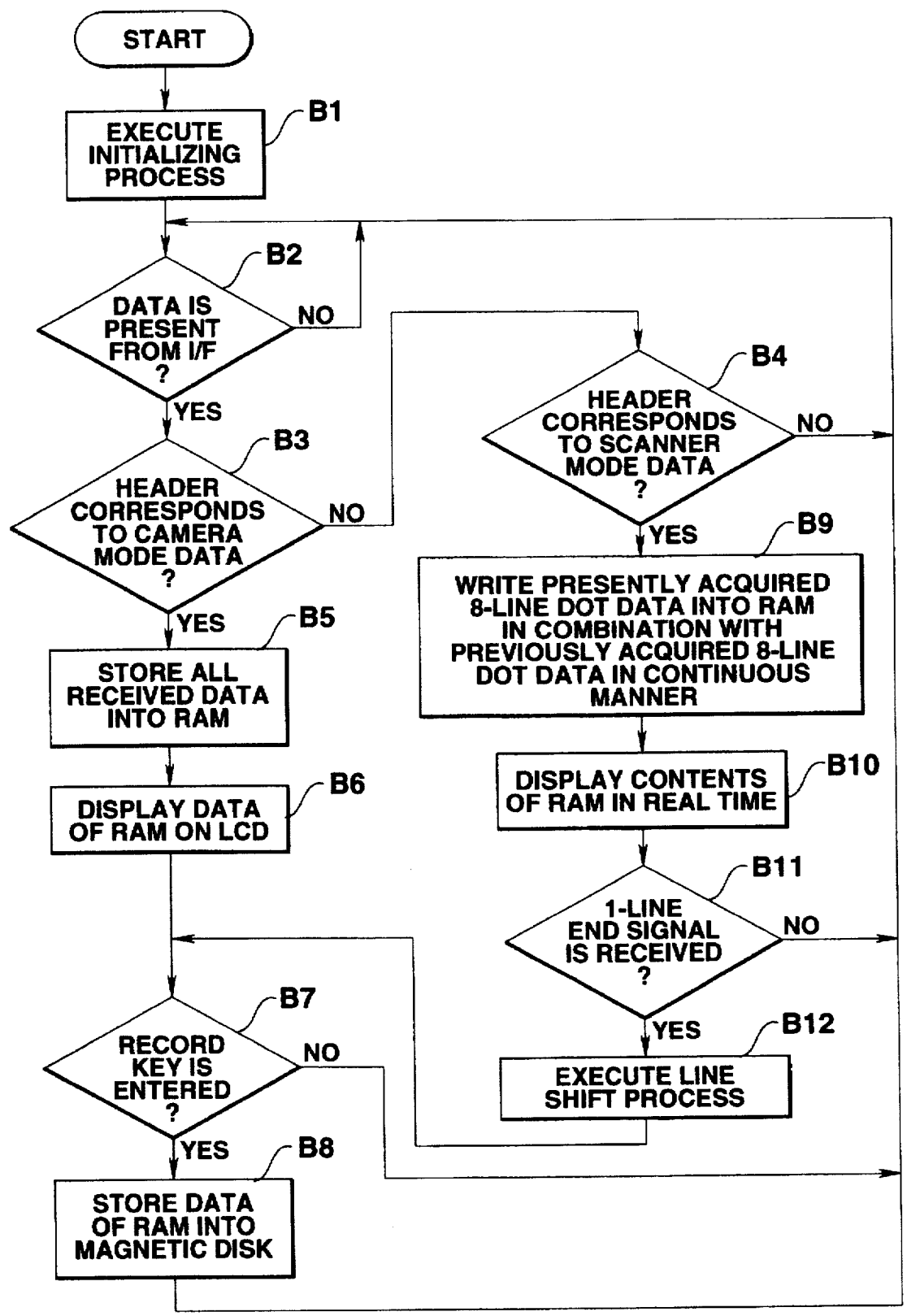
FIG. 7 is a flow chart for describing major operations of the portable terminal apparatus.
Figure 8A:
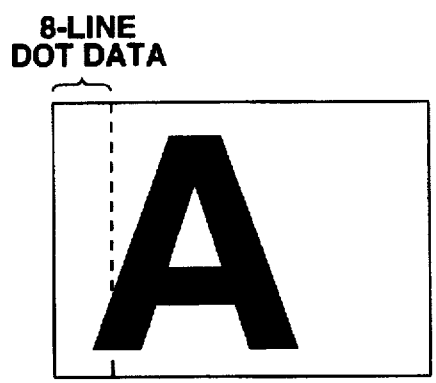
FIGS. 8A and 8B illustratively show a cut out condition of a partial image in the image scanner mode of the pen type data input apparatus.
Figure 8B:
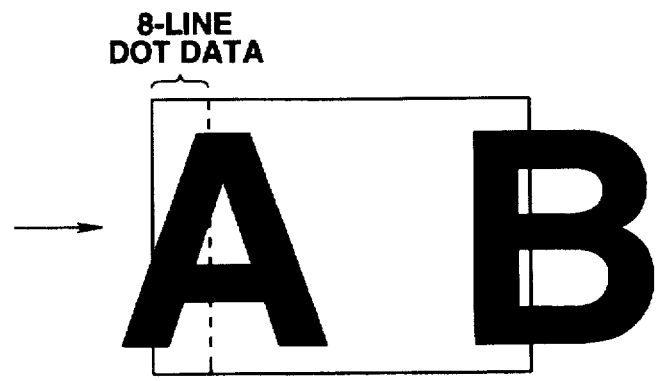

FIG. 7 is a flow chart for indicating a major operation of the CPU 32 employed in the portable terminal apparatus 1.

In this flow operation, when the power source is turned ON, the CPU 32 first initializes the display content and the like (step B1), and then is brought into a waiting state until data is transferred from the interface unit 34 (step B3). Now, when the CPU 32 detects the data transfer operation, this CPU 32 checks as to whether the mode identification data indicative of the camera mode is added to the header of this data (step B3), or the mode identification data representative of the scanner mode is added to this header (step B4). When such a judgement is made that the mode identification data about at the step B3, the image information data for 1 frame which are transferred in the serial manner are sequentially fetched, and the fetched image information data are written into the RAM 35 (step B5). Then, the image information data for 1 frame stored in the RAM 35 are supplied to the liquid crystal display panel 2 so as to display the image information for 1 frame thereon (step B6). On the other hand, in such a case that a judgement is made as to whether or not the record key MK is manipulated (step B7) and this record key MK is manipulated, the memory content of the RAM 35 is stored in the magnetic disk unit 5 (step B8). Next, the process operation is returned to the previous step B2.

Figure 9:
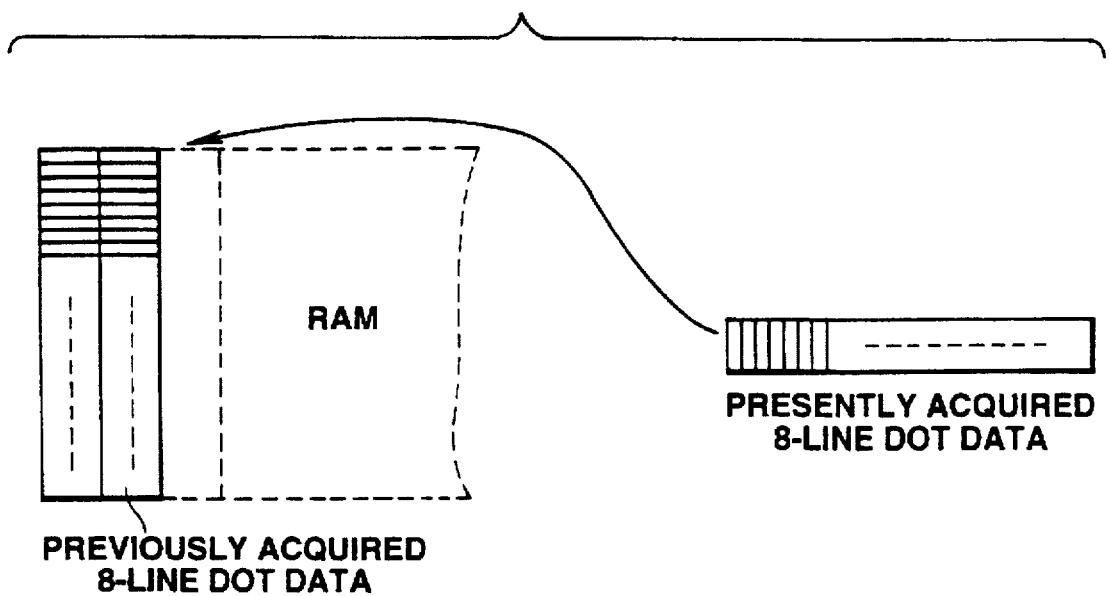
FIG. 9 is an explanatory diagram for explaining such a condition that a partial image is expanded on a RAM as a continuous image.

To the contrary, when it is Judged at the step B4 such that the mode identification data indicative of the scanner mode is added, the 8-lint dot data which are presently transferred are written into the RAM 35 in a continuation manner to the 8-line dot data which have been previously transferred (step B9). FIG. 9 conceptionally represents this condition. Next, the memory content of the RAM 35 is displayed on the liquid crystal display panel 2 (step B10). In this case, since the memory content of the RAM 35 is displayed in real time every time the 8-line dot data are transferred, it is possible to confirm the presently read image data content. Thereafter, the CPU 32 checks as to whether or not the 1-line end signal is received (step B11). If no 1-line end signal is received, then the process operation is directly returned to the step B2. Conversely, if the 1-line end signal is received, then the line shift process operations for the RAM 35 and the display content of the liquid crystal display panel 2 are carried out (step B12). Then, the process operation is advanced from the step B12 to the step B7, and if the record key MK is not manipulated, then the process operation is returned to the step B2.

While the present embodiment have been described in detailed, such an imaging means is employed which is equipped with the imaging lens and the area image sensor where the solid-state imaging elements are arranged in the plane manner. An arbitrary selection can be made such that this imaging means may function as the electronic camera, or as the image scanner used to manually scan the printed matter. In this case, when the imaging means is operated as the electronic still camera, the focal point of the imaging lens 8 is automatically controlled to the far sight range, whereas the imaging means is operated as the image scanner, this focal point is automatically controlled to the near sight range. Also, the moving amount of the pen type data input apparatus 6 is detected in response to the rotation amount of the encoder 28. The imaging operation is carried out every time this moving amount reaches a predetermined moving amount, so that the overlapped image portions are masked among the CCD area images for the plural frames acquired by the imaging operations, and then only the non-overlapped image portions are cut out so as to be read as the continuous image. As a consequence, even when the moving direction (scanning direction) of the pen type data input apparatus 6 is shifted, the CCD area image sensor 25 can be directly employed as the scanning sensor without having the adverse influences caused by this shift. Therefore, it is possible to obtain the scanning images with a better image quality by employing the CCD area image sensor 25.

Figure 10:
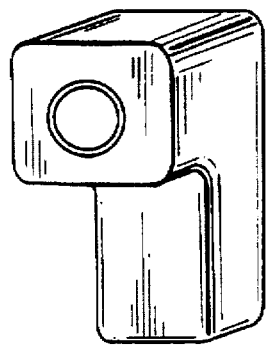
FIG. 10 is a perspective view for showing a portable terminal apparatus according to another preferred embodiment of the present invention.

It should be noted that although the pen type data input apparatus 6 has been described in the above-described embodiment, the present invention is not limited to this pen type data input apparatus, but may be applied to a hand scanner type data input apparatus as indicated in FIG. 10. In FIG. 10, this hand scanner type data input apparatus is arranged by combining a terminal apparatus main body with a scanner unit. Further, an LCD display unit and a keyboard are provided on the rear surface of this hand scanner type data input apparatus. A finder unit is provided with the front surface thereof. In addition, an imaging lens and a rotation roller of an encoder are provided with the lower surface thereof.

In the above-described preferred embodiment, the partial image data are cut out every time the 8-line dot data are acquired. Alternatively, this dot number may be arbitrarily varied by merely changing the movement detection amount. In this case, the desirable dot number may be determined by considering the shutter speed and the moving speed.

Also, the lighting light source 9 has been employed so as to illuminate the recording paper in the above-described embodiment. Alternatively, the main body case of the pen type input apparatus 6 may be made of a plastic material, so that the external light may be directly conducted into the main body case.

What is claimed is:

1. An image information processing apparatus comprising:
    an imaging device for reading an image of an imaging object and for converting the read image of said imaging object into image information;
    an image reading device for deriving continuous image information from the image information produced by said imaging device when an object to be read is manually scanned by said image reading device in response to a moving amount of said manual scanning operation thereof;
    a switching device for switching a function of said imaging device into one of an electronic camera and an image scanner; and
    an output device for outputting the image information for one frame from said imaging device when said switching device switches the function of said imaging device to the electronic camera, and for outputting the continuous image information derived by said image reading device when said switching device switches the function of said imaging device to the image scanner.

2. An image information processing apparatus as claimed in claim 1 wherein said imaging device includes:
    an imaging lens;
    a focal point controller for controlling a focal point of said imaging lens;
    an area image sensor having solid-state imaging elements arranged in a planar manner; and
    an image information processor for converting the image of the imaging object read by said area image sensor into the image information.

3. An image information processing apparatus as claimed in claim 1 wherein said image reading device includes:
    a rotation member rotatable on an object to be read so as to manually scan the object to be read;
    an encoder for detecting a moving amount of said image reading device in accordance with a rotation amount of said rotation member when said rotation member is rotated on said object to be read; and
    an image acquiring device for deriving the continuous image information from the image information produced by said imaging device every time the moving amount detected said encoder reaches a predetermined moving amount.

4. An image information processing apparatus as claimed in claim 3, further comprising:
    a memory for storing the image information produced by said imaging device every time the moving amount detected by said encoder reaches a predetermined moving amount; and
    wherein said image acquiring device derives a partial image from the stored image information and outputs each of the derived partial images as the continuous type information.

5. An image information processing apparatus comprising:
    an imaging device for reading an image of an imaging object and for converting the read image of said imaging object into image information;
    a switching device for switching said imaging device between an electronic camera function and an image scanner function;
    a display device for displaying said image information produced by said imaging device;
    a movement detecting device for detecting a manual-scanning movement of said imaging device when said image device is switched to the image scanner function by said switching device and said imaging object is manually scanned by said imaging device; and
    an image acquiring device for acquiring said image information produced by said imaging device responsive to said movement detection device detecting the manual-scanning movement of said imaging device.

6. An image information processing apparatus as claimed in claim 5, further comprising a light source for illuminating said imaging object while said imaging object is manually scanned by said imaging device.

7. An image information processing apparatus comprising:
    an imaging device for reading an image of an imaging object and for converting the read image of said imaging object into image information;
    a switching device for switching said imaging device between an electronic camera function and an image scanner function;
    a display device for displaying said image information produced by said imaging device;
    a storage device for storing said image information displayed on said display device;
    a control unit for outputting an imaging operation control signal for controlling an imaging operation of the imaging device; and
    a storage control device for causing said storage device to store one frame of the image information produced by said imaging device responsive to said imaging operation control signal output by said control unit when said switching device switches said imaging device to the electronic camera function.

8. An image information processing apparatus comprising:
    an imaging device for reading an image of an imaging object and for converting the read image of said imaging object into image information;
    a switching device for switching said imaging device between an electronic camera function and an image scanner function;
    a display device for displaying said image information produced by said imaging device;
    a storage device for storing said image information displayed on said display device;
    an image acquiring device for acquiring the image information produced by said imaging device as continuous image information responsive to a manual-scanning operation wherein the imaging object is manually scanned by said imaging device when said switching device switches said imaging device to the image scanner function; and
    storage control device for causing said continuous image information acquired by said image acquiring device to be stored in said storage device.

9. An image information input apparatus comprising:
    an imaging device for reading an image of an imaging object and for converting the read image of said imaging object into image information, said imaging device being switchable between an image scanner function and an electronic camera function;
    a focal point controller for controlling a focal point of said imaging device to be set to one of a far sight range and a near sight range in response to a switching instruction for switching the function of said imaging device;

an image acquiring device for acquiring image information of said imaging object produced when said imaging device is switched to the image scanner function, whereby said imaging object is manually scanned by said imaging device based upon the focal point of the near sight range set by said focal point control device; and an image output device for outputting the image information of one frame produced by said imaging device based upon the formal point of the far sight range set by said focal point control device when said imaging device is switched to the electronic camera function.

10. An image information input apparatus as claimed in claim 9, wherein said image acquiring device includes:

a rotation member rotatable on said imaging object; and a moving-amount detecting device for detecting a moving amount of said rotation member in accordance with a rotation operation of said rotation member when said rotation member is rotated on said imaging object when said imaging object is manually scanned;

said image acquiring device acquiring the image information produced by said imaging device as continuous image information responsive to said moving-amount detecting device detecting the moving amount of said rotation member.

11. An image information input apparatus as claimed in claim 10, further comprising:

a memory for storing the image information acquired by manually scanning said imaging object every time the moving amount detected by said moving amount detecting device reaches a predetermined moving amount; and wherein said image acquiring device derives a partial image from the stored image information, and outputs each of the derived partial images as the continuous image information.

* * * * *